(12) United States Patent
Jons

(10) Patent No.: US 9,795,922 B2
(45) Date of Patent: Oct. 24, 2017

(54) HYPERFILTRATION SYSTEM SUITABLE FOR HOUSEHOLD USE

(71) Applicant: Dow Global Technologies LLC, Midland, MI (US)

(72) Inventor: Steven D. Jons, Eden Prairie, MN (US)

(73) Assignee: Dow Global Technologies LLC, Midland, MI (US)

( * ) Notice: Subject to any disclaimer, the term of this patent is extended or adjusted under 35 U.S.C. 154(b) by 21 days.

(21) Appl. No.: 14/912,715

(22) PCT Filed: Sep. 2, 2014

(86) PCT No.: PCT/US2014/053643
§ 371 (c)(1),
(2) Date: Feb. 18, 2016

(87) PCT Pub. No.: WO2015/047667
PCT Pub. Date: Apr. 2, 2015

(65) Prior Publication Data
US 2016/0200597 A1    Jul. 14, 2016

Related U.S. Application Data

(60) Provisional application No. 61/882,677, filed on Sep. 26, 2013.

(51) Int. Cl.
*C02F 1/44* (2006.01)
*B01D 61/02* (2006.01)
(Continued)

(52) U.S. Cl.
CPC ......... *B01D 61/027* (2013.01); *B01D 61/025* (2013.01); *B01D 61/12* (2013.01);
(Continued)

(58) Field of Classification Search
CPC ............ B01D 2311/06; B01D 2311/08; B01D 2311/16; B01D 2311/25; B01D 2311/12;
(Continued)

(56) References Cited

U.S. PATENT DOCUMENTS

| 4,046,685 A | 9/1977 | Bray |
| 4,629,568 A | 12/1986 | Ellis |

(Continued)

FOREIGN PATENT DOCUMENTS

| EP | 1577267 A1 | 9/2005 |
| WO | 9623733 | 8/1996 |

(Continued)

*Primary Examiner* — Pranav Patel
(74) *Attorney, Agent, or Firm* — Edward W. Black

(57) ABSTRACT

A hyperfiltration system (10) and method for treating water including: a vessel (20) having a feed inlet (22), a permeate outlet (24), and a concentrate outlet (26); at least one spiral wound membrane element (28) located within the vessel (20); a pump (30) having a low pressure side (32) in fluid communication with a source of feed water (40) through a junction point (42) and a high pressure side (34) in fluid communication with the feed inlet (22); a permeate valve (50) connected to the permeate outlet (24) and adapted to selectively direct permeate flow between a treated water outlet (52) and the junction point (42); a flow path (60) between the concentrate outlet (26) and a discharge (62); and a flow restrictor (64) located along the flow path (60) and adapted to vary resistance to concentrate flow between a high and low value.

2 Claims, 1 Drawing Sheet

(51) Int. Cl.
*B01D 61/12* (2006.01)
*B01D 63/10* (2006.01)
*B01D 67/00* (2006.01)

(52) U.S. Cl.
CPC ......... *B01D 63/10* (2013.01); *B01D 67/0097* (2013.01); *C02F 1/441* (2013.01); *C02F 1/442* (2013.01); *B01D 2311/02* (2013.01); *B01D 2311/06* (2013.01); *B01D 2311/14* (2013.01); *B01D 2311/16* (2013.01); *B01D 2311/25* (2013.01); *B01D 2321/02* (2013.01); *B01D 2321/12* (2013.01); *C02F 2307/10* (2013.01)

(58) Field of Classification Search
CPC .... B01D 61/02; B01D 61/025; B01D 61/027; B01D 61/08; B01D 61/10; B01D 61/12; B01D 61/14; B01D 61/145; B01D 61/147; B01D 61/18; B01D 61/20; B01D 61/22; B01D 63/10; C02F 1/441; C02F 1/442; C02F 1/444; C02F 2103/08; C02F 2103/04; C02F 2201/005; C02F 2209/003; C02F 2209/005; C02F 2209/006; C02F 2209/03; C02F 2209/05; C02F 2209/055; C02F 2209/40; C02F 2301/04; C02F 2301/046; C02F 2301/06
See application file for complete search history.

(56) References Cited

U.S. PATENT DOCUMENTS

| | | | |
|---|---|---|---|
| 4,650,586 A | 3/1987 | Ellis | |
| 4,773,993 A | 9/1988 | Yoda et al. | |
| 5,503,735 A | 4/1996 | Vinas et al. | |
| 6,074,551 A | 6/2000 | Jones et al. | |
| 6,190,558 B1 | 2/2001 | Robbins | |
| 6,908,546 B2 | 6/2005 | Smith | |
| 7,410,581 B2 | 8/2008 | Arnold et al. | |
| 3,048,315 A1 | 11/2011 | Fendya et al. | |
| 8,778,182 B2 | 7/2014 | Johnson et al. | |
| 2003/0141250 A1 | 7/2003 | Kihara et al. | |
| 2004/0146879 A1 | 7/2004 | Astle et al. | |
| 2004/0168978 A1 | 9/2004 | Gray | |
| 2004/0222158 A1* | 11/2004 | Husain | B01D 61/04 210/651 |
| 2007/0272628 A1 | 11/2007 | Mickols et al. | |
| 2008/0149554 A1 | 6/2008 | Kung et al. | |
| 2009/0097369 A1 | 4/2009 | Chen et al. | |
| 2011/0147310 A1 | 6/2011 | Ito et al. | |
| 2012/0205307 A1 | 8/2012 | Boudinar | |

FOREIGN PATENT DOCUMENTS

| | | |
|---|---|---|
| WO | 2007018561 | 2/2007 |
| WO | 2011/130522 A1 | 10/2011 |
| WO | 2011130522 | 10/2011 |
| WO | 2012086478 | 6/2012 |
| WO | 2014/061695 A1 | 4/2014 |
| WO | 2014061695 | 4/2014 |
| WO | 2014176067 | 10/2014 |

* cited by examiner

HYPERFILTRATION SYSTEM SUITABLE FOR HOUSEHOLD USE

FIELD

The invention relates to hyperfiltration systems including those suitable for household use.

INTRODUCTION

Reverse osmosis (RO) membrane systems are used to treat liquids in a variety of industrial, municipal and residential applications. One increasingly popular application is the treatment of feed or "tap" water prior to consumption or use, e.g. in household appliances. In a typical household embodiment, pressurized feed water passes through a vessel comprising at least one spiral wound RO membrane element and produces a potable "permeate" and a concentrate or "brine". Permeate may be continuously or intermittently collected in a permeate storage tank making it available on demand. Concentrate is typically routed to the drain.

When the system is not in use, salts and other impurities present in the feed water within the RO element slowly diffuse through the RO membrane. Consequently, when the system is re-activated, the initial source of permeate produced by the RO membrane has relatively high concentration of impurities. This effect may be less detectable in systems having large permeate storage tanks where such salts are quickly diluted. U.S. Pat. No. 6,190,558 describes a system for mitigating this effect without the use of a permeate storage tank. The system includes a pump that operates as soon as the tap is opened and continues to operate for an extended period of time after the tap is closed. During this extended time period, a recirculation loop is established where purified water permeating through the RO membrane is mixed with recirculated concentrate and a small quantity of fresh feed water, and the resulting mixture is recirculated to the feed side of the RO membrane element. Unfortunately, this system requires a long recirculation time in order to reduce salt and minerals to acceptably low levels. In some embodiments, recycled brine may actually lead to membrane scale and fouling.

SUMMARY

In one embodiment the invention includes a hyperfiltration system (10) for treating water including: a vessel (20) having a feed inlet (22), a permeate outlet (24), and a concentrate outlet (26); at least one spiral wound membrane element (28) located within the vessel (20); a pump (30) having a low pressure side (32) in fluid communication with a source of feed water (40) through a junction point (42), and a high pressure side (34) in fluid communication with the feed inlet (22); a permeate valve (50) connected to the permeate outlet (24) and adapted to selectively direct permeate flow between a treated water outlet (52) and the junction point (42); a flow path (60) between the concentrate outlet (26) and a discharge (62); and a flow restrictor (64) located along the flow path (60) and adapted to vary resistance to concentrate flow between a high and low value. The invention also includes methods for operating such systems.

BRIEF DESCRIPTION OF THE DRAWINGS

The figures are not to scale and include idealized views to facilitate description. Where possible, like numerals have been used throughout the figures and written description to designate the same or similar features.

FIG. 3 is a schematic view of a subject system operating during an element flush phase.

DETAILED DESCRIPTION

Figure 1:
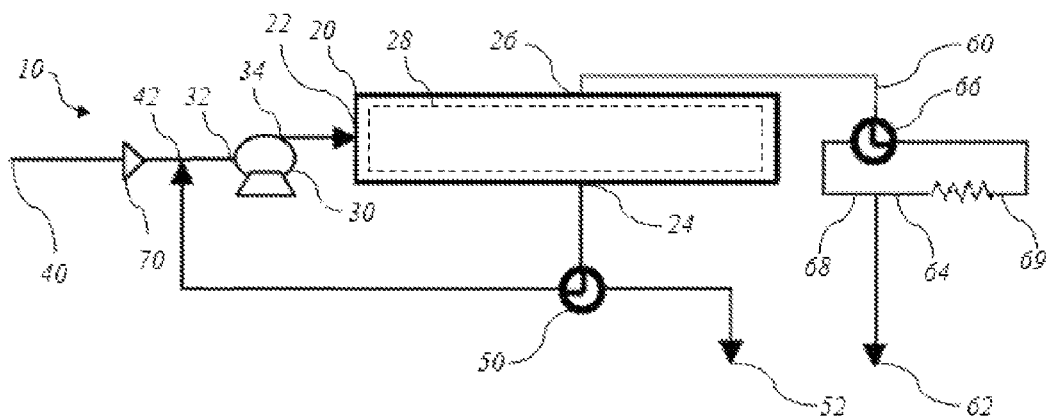
FIG. 1 is a schematic view of an embodiment of the invention.

The present invention includes spiral wound modules ("elements") suitable for use in reverse osmosis (RO) and nanofiltration (NF). Such modules include one or more RO or NF membrane envelops and feed spacer sheets wound around a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. For purposes of the present description, NF and RO are collectively referred to as "hyperfiltration".

Spiral wound membrane elements may be formed by winding one or more membrane envelopes and optional feed channel spacer sheet(s) ("feed spacers") about a permeate collection tube. Each membrane envelope preferably comprises two substantially rectangular membrane sheets surrounding a permeate channel spacer sheet ("permeate spacer"). This sandwich-type structure is secured together, e.g. by sealant, along three edges while the fourth edge abuts the permeate collection tube. The permeate spacer is in fluid contact with openings passing through the permeate collection tube. An outer housing of the element may be constructed from a variety of materials including stainless steel, tape and PVC material. Additional details regarding various components and construction of spiral wound elements are provided in the literature, see for example: U.S. Pat. No. 5,538,642 which describes a technique for attaching a permeate spacer to a permeate collection tube, U.S. Pat. No. 7,951,295 which describes trimming operations and the use of a UV adhesive for forming a insertion point seal, U.S. Pat. No. 7,875,177 which describes an applicable leaf packet.

The membrane sheet is not particularly limited and a wide variety of materials may be used, e.g. cellulose acetate materials, polysulfone, polyether sulfone, polyamides, polyvinylidene fluoride, etc. A preferred membrane sheet is a composite structure having a discriminating layer formed by interfacially polymerization. A typical composite hyperfiltration membrane includes a backing layer (back side) of a nonwoven backing web (e.g. a non-woven fabric such as polyester fiber fabric available from Awa Paper Company), a middle layer comprising a porous support having a typical thickness of about 25-125 µm and top discriminating layer (front side) comprising a thin film polyamide layer having a thickness typically less than about 1 micron, e.g. from 0.01 micron to 1 micron but more commonly from about 0.01 to 0.1 µm. The backing layer is not particularly limited but preferably comprises a non-woven fabric or fibrous web mat including fibers which may be orientated. Alternatively, a woven fabric such as sail cloth may be used. Representative examples are described in U.S. Pat. No. 4,214,994; U.S. Pat. No. 4,795,559; U.S. Pat. No. 5,435,957; U.S. Pat. No. 5,919,026; U.S. Pat. No. 6,156,680; US 2008/0295951 and U.S. Pat. No. 7,048,855. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly (methyl methacrylate), polyethylene, polypropylene, and various halogenated polymers such as polyvinylidene fluoride. The discriminating layer is preferably formed by an interfacial polycondensation reaction between a polyfunctional amine monomer and a polyfunctional acyl halide monomer upon the surface of the microporous polymer layer as described in U.S. Pat. No. 4,277,344 and U.S. Pat. No. 6,878,278.

With reference to the figures, an embodiment of the subject hyperfiltration system is generally shown at 10 including a vessel (20) having a feed inlet (22), a permeate outlet (24), and a concentrate outlet (26). The vessels used in the present invention are not particularly limited but generally include a housing structure (e.g. plastic, metal, fiberglass, encapsulating foam) capable of withstanding pressures associated with operating conditions. For household applications, operating pressures are typically less than 2 MPa or even less than 1 MPa. The vessel structure preferably includes a chamber having an inner periphery corresponding to that of the outer periphery of the spiral wound element(s). The length of the chamber preferably corresponds to the combined length of the elements to be sequentially (axially) loaded. For household applications, a representative element is model no. TW30-1812-75 available from The Dow Chemical Company. In a preferred embodiment, a single element (28) is located within the vessel (20). In an alternative embodiment, two serially positioned spiral wound membrane elements (28) are located within the vessel (20). The orientation of the vessel is not particularly limited, e.g. both horizontal and vertical orientations may be used.

The system (10) further includes a pump (30) having a low pressure side (32) in fluid communication with a source of feed water (40) through a junction point (42), and a high pressure side (34) in fluid communication with the feed inlet (22). The selection of pump is not particularly critical but for household applications, a small electrically powered pump capable of generating fluid pressures of at least 100 kPa is generally desired.

The system (10) further includes a permeate valve (50) connected to the permeate outlet (24). The valve (50) is adapted to selectively direct permeate flow between a treated water outlet (52) (e.g. a tap faucet, household appliance such as an ice maker, flatware washer, etc.) and the junction point (42).

A flow path (60), e.g. pipe, conduit, etc. extends between the concentrate outlet (26) and a discharge (62), e.g. drain. A flow restrictor (64) is located along the flow path (60) and adapted to impose a variable resistance to concentrate flow between a high and low value. While not particularly limited, in the illustrated embodiment the flow restrictor (64) includes a concentrate valve (66) adapted to selectively direct concentrate flow along the flow path (60) to the discharge (62) by way of a low resistance path (68) and a high resistance path (69). The high resistance path (69) may comprise a passive constraint to fluid flow, such as bundle of hollow fibers, etc., or active, e.g. an adjustable valve with a variable sized orifice. The spiral wound membrane element (28) provides a resistance to liquid flow between the feed inlet (22) and permeate outlet (24). In a preferred embodiment, the ratio of the high value of resistance to concentrate flow imposed by the flow restrictor (64) via the high resistance path (69) and the resistance to liquid flow provided by spiral wound membrane element (28) is greater than 3 when measured using pure water at 25° C. In another preferred embodiment, the ratio of the low value of resistance via the low resistance path (68) to concentrate flow imposed by the flow restrictor (64) and the resistance to liquid flow provided by spiral wound membrane element (28) is greater than ⅓ when measured using pure water at 25° C. More preferably, this ratio is greater than ½ or even 1. For purposes of this descriptions, "resistance" (R) is defined as the ratio of pressure drop ($\Delta p$) to flow (F), i.e. $R=\Delta p/F$, and measured when the vessel is operated with an average permeate flux of 25 lmh.

Figure 2A:
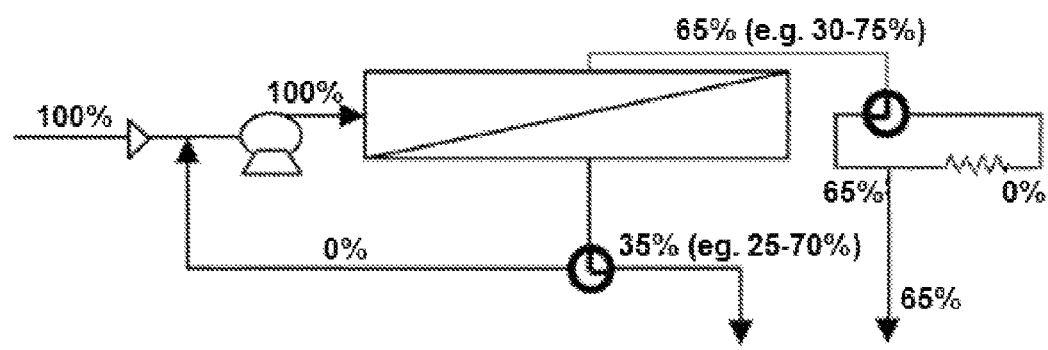
FIG. 2 is a schematic view of a subject system operating during a permeate producing phase.
Figure 2B:
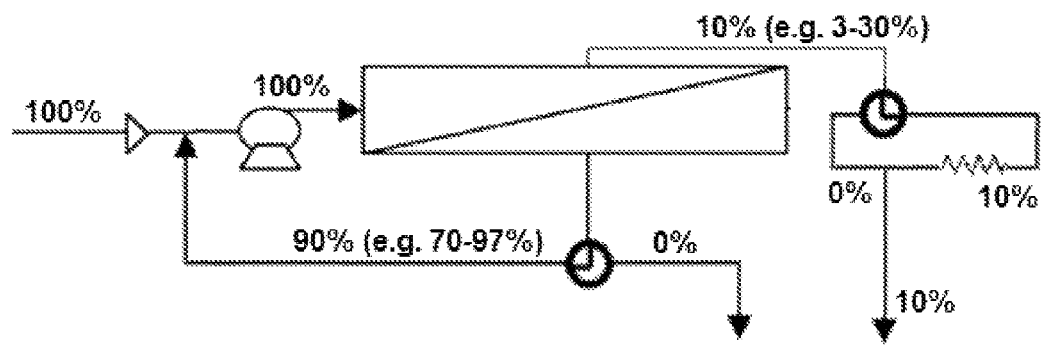

The invention further includes a method for treating a source of feed water (40) using the above-described system (10). The system (10) is connected a source of feed water (40) as illustrated in FIG. 1, i.e. piping or tubing from a source of feed water is connected to the junction point (42). An optional feed flow directing valve (70) may be installed between the source of feed water (40) and the junction point (42). The feed flow directing valve (70) prevents water from flowing from the junction point (42) to the source of feed water (40). Once installed, feed water may be treated by activating pump (30) (e.g. in response to a demand for treated water such as the opening of a tap faucet) to force water from the feed source (40), into the feed inlet (22) of the vessel (20) and through the spiral wound membrane element (28) to produce a permeate that exits the vessel (20) through the permeate outlet (24) and concentrate that exits the vessel (20) through the concentrate outlet (26). While the pump is activated (i.e. operating), permeate is produced at the permeate outlet (24) by actuating the permeate valve (50) such that permeate is directed to the treated water outlet (52) rather than the junction point (42). The flow restrictor (64) is also actuated (preferably simultaneously) such that a low value of resistance is imposed upon the concentrate flowing to the discharge (62). This step of producing permeate is schematically illustrated in FIG. 2. Once permeate demand is terminated, (e.g. tap faucet is closed), the pump (30) may continue to operate, or optionally be temporarily inactivated, e.g. for 15 minutes, and then re-activated. The element (28) is flushed by actuating the permeate valve (50) such that permeate is directed to the junction point (42) rather than the treated water outlet (52) and actuating the flow restrictor (64) such that a high value of resistance is imposed upon concentrate flowing to the discharge (62). This step of flushing the element is schematically illustrated in FIG. 3. Actuation of the pump and valves (50) (66) is preferably electronically controlled and coordinated by integrated circuitry, timers or similar means, e.g. PLC, PLR, etc.

During the step of producing permeate, the system and vessel are both preferably operated at a permeate recovery of from 25 to 70%. More preferably, vessel recovery is greater than 30% or even 40%. The system recovery is defined as the total permeate volume leaving the system (e.g. from 52) compared to volume of feed water entering the system (e.g. from 40). The vessel recovery is defined as the permeate volume leaving the vessel (e.g. from 24) compared to that entering the vessel (e.g. from 22). In the presence of brine recirculation, the system recovery would be greater than the vessel recovery. However, it is preferred that the concentrate outlet (26) is not connected to the pump inlet (32), so that the system does not include brine recirculation. Brine recirculation is often used to promote an even flux distribution and to increase cross flow so as to decrease polarization and scaling. To alternatively address scaling, especially at high recoveries, a preferred embodiment includes an element within the vessel having a feed flow path, and more preferably a serpentine feed flow path, directed from the permeate tube to the periphery of the spiral element.

During the step of flushing the element (28), the vessel (20) is preferably operated at a permeate recovery of from 70 to 97%. This increase in vessel recovery is achieved by increasing the resistance to concentrate flow. As a result, a relatively small quantity of concentration is discharged during the flushing step and less make-up water (feed) is required for the flush step. A small time is required to rinse the feed channel, as the flush step causes water with a high fraction of permeate to be recirculated into the vessel. Hence, less salt, TDS and other impurities are present to migrate into the permeate channel during periods of non-use. Although such high recovery (>70%) operation of a vessel (20) would typically induce fouling and/or scaling, the described process can actually improve the membrane surface and is compatible with high (e.g. at least 25% permeate recovery) recovery elements (28) and corresponding modes of operation.

Many embodiments of the invention have been described and in some instances certain embodiments or other features have been characterized as being "preferred." Such designations of "preferred" features should in no way be interpreted as an essential or critical aspect of the invention. While largely described for use in household applications, the system may also be used in a wide variety of industrial, municipal and residential applications. In a preferred embodiment, the system is further characterized by excluding a permeate holding tank or vessel.

The invention claimed is:

1. A method for treating a source of feed water (40) without using recirculated brine or a permeate holding tank, comprising the steps:

i) obtaining a hyperfiltration system (10) comprising:
a vessel (20) having a feed inlet (22), a permeate outlet (24), and a concentrate outlet (26);
at least one spiral wound membrane element (28) located within the vessel (20);
a pump (30) having a low pressure side (32) in fluid communication with the source of feed water (40) through a junction point (42), and a high pressure side (34) in fluid communication with the feed inlet (22);
a permeate valve (50) connected to the permeate outlet (24) and adapted to selectively direct permeate flow between a treated water outlet (52) and the junction point (42);
a flow path (60) between the concentrate outlet (26) and a discharge (62) which is characterized by being unconnected to the low pressure side (32) of the pump (30); and
a flow restrictor (64) located along the flow path (60) and adapted to impose a variable resistance to concentrate flow between a high and low value;

ii) activating the pump (30) to force water from the source of feed water (40), into the feed inlet (22) of the vessel (20) and through the spiral wound membrane element (28) to produce a permeate that exits the vessel (20) through the permeate outlet (24) and concentrate that exits the vessel (20) through the concentrate outlet (26), and while the pump is activated:

iii) producing the permeate at the permeate outlet (24) by actuating the permeate valve (50) such that the permeate is directed to the treated water outlet (52) and actuating the flow restrictor (64) such that the low value of resistance is imposed upon the concentrate flowing to the discharge (62), iv) flushing the spiral wound membrane element (28) by actuating the permeate valve (50) such that the permeate is directed to the junction point (42) while no permeate is directed to the treated water outlet (52) and actuating the flow restrictor (64) such that the high value of resistance is imposed upon the concentrate flowing to the discharge (62), and v) deactivating the pump (30); and wherein:

a) the step of producing the permeate at the permeate outlet (24) is characterized by operating the vessel (20) at a permeate recovery of from 25 to 70% wherein the permeate recovery is defined as the total permeate volume leaving the vessel compared to the volume of feed water entering the vessel; and b) the step of flushing the spiral wound membrane element (28) is characterized by operating the vessel (20) at a permeate recovery of from 70 to 97%.

2. The method of claim 1 wherein the pump (30) is deactivated and reactivated between the steps of producing the permeate and flushing the spiral wound membrane element (28).

* * * * *